United States Patent [19]

Mishiro et al.

[11] 4,234,431

[45] Nov. 18, 1980

[54] MEMBRANE FILTRATION TYPE HOLLOW FIBERS AND METHOD FOR THE PREPARATION OF SAME

[75] Inventors: Mashahiro Mishiro, Moriyama; Tokio Nishikawa, Hikone; Shigeyasu Ohashi, Moriyama; Yasuo Yokokawa, Tanashi, all of Japan

[73] Assignee: Asahi Kasei Kogyo Kabushiki Kaisha, Osaka, Japan

[21] Appl. No.: 831,198

[22] Filed: Sep. 7, 1977

Related U.S. Application Data

[63] Continuation of Ser. No. 657,346, Feb. 11, 1976, abandoned.

[30] Foreign Application Priority Data

Feb. 15, 1975 [JP] Japan .................................. 50-18426

[51] Int. Cl.³ ...................... B01D 13/04; B01D 31/00
[52] U.S. Cl. ................................ 210/500 M; 264/49; 264/200; 264/203; 521/61
[58] Field of Search ........... 210/321 R, 321 A, 321 B, 210/500 M; 264/209, 49, 41, 203, 200; 260/2.5 M, 2.5 E, 2.5 N; 521/61, 64

[56] References Cited

U.S. PATENT DOCUMENTS

| | | | |
|---|---|---|---|
| 3,592,953 | 7/1971 | Ward | 264/49 |
| 3,888,771 | 6/1975 | Isuge et al. | 210/500 M |
| 3,930,105 | 12/1975 | Christen et al. | 428/398 |
| 3,975,478 | 8/1976 | Leonard | 264/41 |
| 4,062,782 | 12/1977 | Kunst et al. | 210/500 M |

Primary Examiner—Charles N. Hart
Assistant Examiner—David R. Sadowski
Attorney, Agent, or Firm—Sprung, Felfe, Horn, Lynch & Kramer

[57] ABSTRACT

The invention concerns a membrane filtration type hollow fiber. It is composed of a single material phase which material is a chain high polymer such as cellulose acetate and capable of forming fibers by the spinning of the high polymer. The cylindrical wall defining the hollow fiber represents a three-dimensional net-like structure of fine filtering passages. This structure occupies substantially the whole mass of the tubular wall or a closed ring band zone when seen in any cross-section of the wall, providing thus an effective and active filtering zone. The pore rate amounts to at least 55%, and active points of the filtering passages for governing minimum passable sizes of the passages for solids included in a filtering liquor to be treated upon are distributed at random throughout at least the active zone. These sizes are nearly uniform.

6 Claims, 19 Drawing Figures x3750

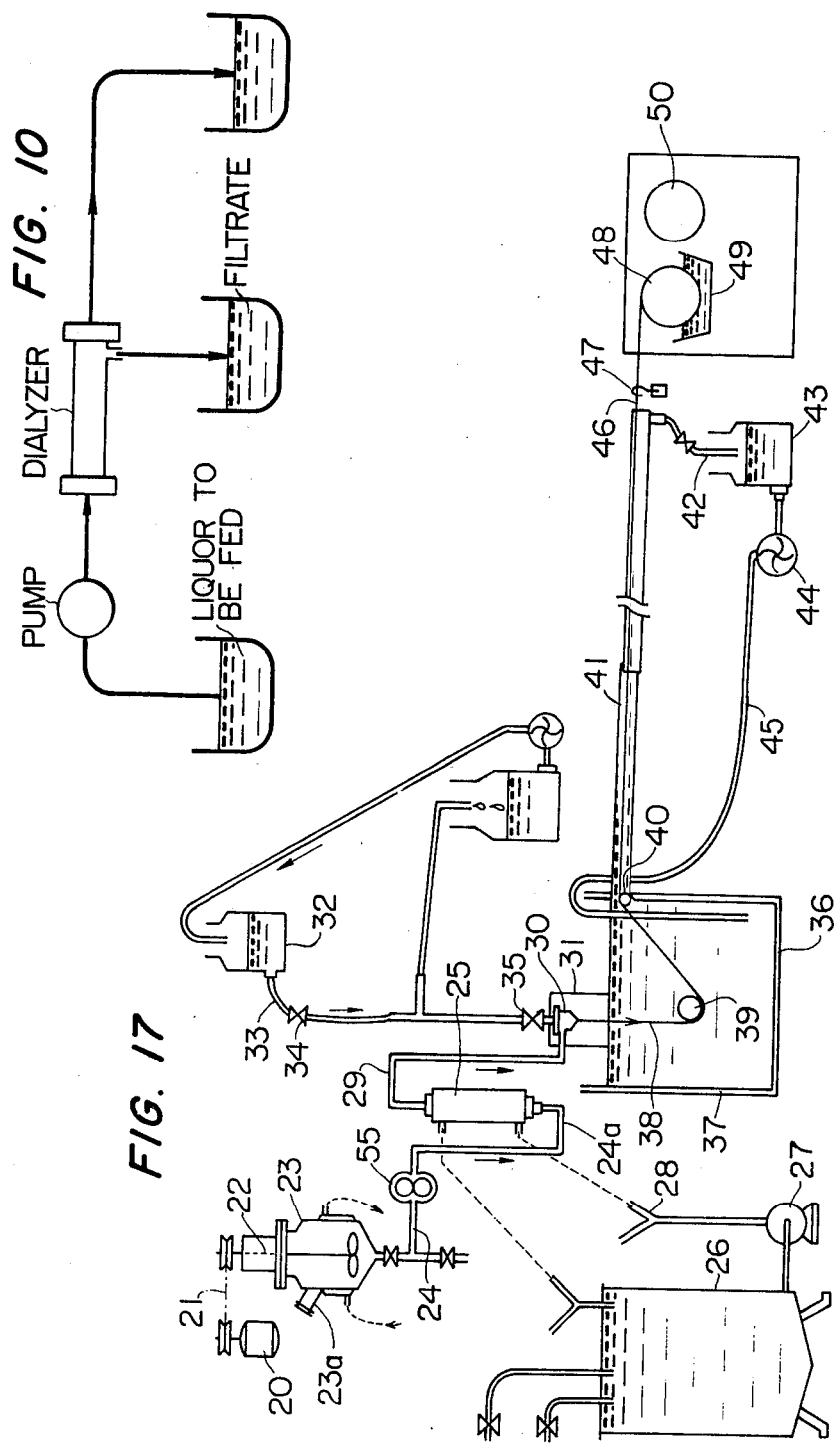

x12500 x12500 x267 x800

×800

×2400 x 267

MEMBRANE FILTRATION TYPE HOLLOW FIBERS AND METHOD FOR THE PREPARATION OF SAME

This is a continuation of application Ser. No. 657,346 filed Feb. 11, 1976, now abandoned.

BACKGROUND OF THE INVENTION

This invention relates generally to improved membrane filter type artificial hollow fibers whose filtering tubular walls are formed therein a three-dimensional net-like system of fine filtering passages. The invention relates further to a process for the manufacture of such hollow fibers.

Hollow fibers having the reverse osmotic membrane performance of substantially unified structure have hitherto been known, as revealed in Japanese Patent Publication Nos. Sho-44-14215 and Sho-49-34305, published June 24, 1969 and Sept. 13, 1974, respectively, in the name of The Dow Chemical Corporation, Michigan.

Other reverse osmotic hollow-fibers as proposed in Japanese Opened Patent Specification Nos. Sho-47-4010 and Sho-49-50289, opened to public inspection Feb. 28, 1972 and May 15, 1974, respectively, in the name of Monsanto Company, Missouri, comprise a most dense, highly thin layer or active one locally positioned rather in close proximity to either wall surface of the fiber, characterized by gradually larger pore sizes when viewed in section thereof and towards the inside wall surface of the fiber.

Ultra filtration hollow fibers are also known as revealed in Japanese Patent Publication No. Sho-47-40890 and Japanese Opened Patent Specification No. Sho-49-90684, published Oct. 16, 1972 and opened Aug. 29, 1974 to public inspection, respectively, and in the respective name of Rhone-Poulenc S.A., Paris and Asahi Chemical Industry Co., Ltd., Osaka. These hollow fibers have its active layer formed on either outer or inner wall surface of the fiber.

It should be mentioned that the above former type hollow fibers represent only reverse osmotic membrane performance, thereby the pore size being all less than $0.001\mu$. Therefore, their practical use was directed in the dialysis with artificial kidneys and the salt separation from sea water and similar jobs. Generally speaking, these hollow fibers are exclusively used for filtering separation of highly fine ingredients.

On the contrary, the above latter type hollow fibers for ultra filtration are effectively utilized for filtering separation of those which have similar molecular weights to urea, vitamine $B_{12}$ and the like. This type hollow fibers have been utilized for most purposes, and indeed, with combination of the reverse osmotic hollow fibers in the refining of liquids and for separation of above products therefrom.

Specific hollow fibers are also known as revealed in Japanese Open Patent Specification No. Sho-48-77111 opened Oct. 17, 1973 in the name of Asahi Chemical Industry Co., Ltd., Osaka, representing finer pore passages than $10\mu$. According to our precise experiments, however, substantial difficulties have been experienced in the realization of unified structure of whole tubular wall which represents gradually finer pore passages when seen in cross-section towards the inside wall surface.

It is, therefore, a main object of the present invention to provide a hollow fiber having the membrane filtration performance according to which yeasts, fungi, pathologenic viruses and the like may advantageously be retained during filtration, while urease, albumin, haemoglobin and the like may pass through the pore passages of the hollow fiber, thus providing a unique and specific filter performance which can not be attained in the past by use of the hollow fiber.

A further object is to provide a highly improved hollow fiber providing the reversible filtering performance through the pored fiber wall with substantially equal results, thus representing a substantially broadened availability of the hollow fiber liquid filter.

SUMMARY OF THE INVENTION

The hollow fiber according to this invention is made of synthetic or semisynthetic chain high polymer having a performance of fiber formation when spun as per se, or in the form of a solution thereof. Thus, the hollow fiber represents a single material phase.

The material usable for this purpose may be, by way of example, cellulose acetate, preferably mono-, di- or triacetate; saponification product thereof; or nitrocellulose, or when generally speaking, spinnable cellulose derivative. In place of above substances, polyvinylchloride polymer or acrylonitrile polymer may be utilized.

In addition, polyamide polymer, such as nylon 6, nylon 66 or the like may be used.

However, in consideration of the fact that the membrane filtration technique using the hollow fibers according to this invention may be used possibly most frequently in the field of food-, medical, and pharmaceutical industries, for filtration of protein and the like substance, as the most advantageous application of the present invention, cellulose derivatives may be most advantageously utilized, especially on account of least harmfullness to human organs.

The term "hollow fiber" as used throughout the present specification is meant by a tubular fiber having an elongated core cavity extending the longitudinal axis of the fiber.

The tubular body of this hollow fiber represents, at least at its effectively filtering zone, a three-dimensional netlike structure of fine pore passages. Such network will occupy generally the whole cross-sectional area of the hollow tubular wall of the fiber. In occasions, however, the zone may appear as a closed ring band having a substantial width and occupying a substantial part of each cross-section of the hollow fiber.

The pore ratio is larger than 55%.

The tubular wall of hollow fiber of the present invention may be practically wholly composed a net-like or tree-like mutually communicatable fine filtering passages, as can be practically demonstrated by viewing under an electron- or even optical microscope. Most of these fine filtering passages extend from the inside to outside surface of the tubular body in a highly complicated zigzag way. By the provision of these fine net-like filtering passage pore system, the hollow fiber provides a sharp filtering performance, as will be later more fully described. The filtering sharpness corresponds substantially to a narrow range of minimum pore sizes at the active points of the fine net- or tree-like passage pore system.

This feature may be compared with conventional hollow fiber filters, most of which are formed with rather straight passage pores. More frequent and sooner clogging of the pores may be encountered with such rather straight pore passages. In addition, the filtering sharpness and -capacity could be lowered.

It is called that the reverse osmotic filter may have a max. filtering capacity of 2 m³/m²·d. The corresponding value of the ultrafilter may amount to 5 m³/m²·d according to our latest knowledge. In comparison, the hollow fiber filter of the present invention will amount to over 10 m³/m²·d.

The term "membrane filtration type" as used throughout this specification and appended claims is meant by such filtering wall that the mean minimum filtering passage pore size formed therein lies within such a range as defining smaller than 1μ and larger than 0.01μ, preferably smaller than 1μ and larger than 0.05μ, and more preferably smaller than 1μ and larger than 0.1μ. By the adoption of the above specified range of mean minimum filtering passage pore size, protein particles of several thousand to several hundred thousand molecular weight, preferably those of 50,000–300,000 molecular weight, can be satisfactorily passed through the filtering wall of the hollow fiber. On the other hand, unallowable passage of larger molecular particles such as yeast (of 2–4μ), fungi (of 0.2–2μ) and disease-inviting vires (of molecular weight: 2,400,000 or so) can be effectively checked. Therefore, filterable molecular weight ranges from several thousand to several hundred thousand, preferably 50,000–300,000. Thus, albumin of molecular weight 69,000 or so may pass while fungi can not pass.

The pore ratio P as used herein may be determined by the following formula:

$$P = (1 - Pb/Pa) \times 100$$

Pa used in the above formula stands for the specific gravity of the real substance (or solid part) of the hollow fiber; Pb stands for the weight of the hollow fiber divided by the volume of the tubular filtering wall of the hollow fiber.

The tubular filtering wall of the hollow fiber according to this invention represents no localized active layer which means, as an example, no formation of such passage pore configuration as representing its minimum pore at outer surface of the tubular wall and gradually increase towards the inner surface and vice versa. Thus, the minimum pore size zones of the filtering passages are concentrated at or towards either surface of the tube structure, thus forming a superficial or nearly superficial layer. On the contrary, the filtering tubular wall of the hollow fiber according to this invention, the active zones of all the filtering passages, representing each a minimum pore size along the related filtering passage leading from either surface of the tube to the opposite surface thereof, are scattered at random over the whole mass of at least the effective filtering zone. Therefore, the filtering wall of the hollow fiber according to this invention represents at least an its effective filtering layer a unified phase, and, therefore, no discriminatable difference between the both surfaces of the tube. Thanks to such structure, the hollow fiber represents a substantially equal filtering performance in the both filtering directions.

It has been surprisingly found that the spinning solution mixture containing chain high polymer, primary solvent, core-forming substance and secondary solvent in any of the above specified mixing ratio and well dispersed into a homogeneous solution or dispersion can not provide a membrane filter structure employable in the present invention, even if it is formed at this stage into a thin film by spreading over a polished plane such as plate glass and solidified in the atmosphere and then washed with a non-solvent to the polymer substance. In this case, the core-forming substance and the secondary solvent does not act in the desired manner to be described.

For attaining the desired object of the invention, the above liquid material composition must be brought at first to its gel-state and then solidified under utilization of inside and outside solidifying bath liquids which may be of the same kind when occasion may desire. These bath liquids act upon the membrane filter material at its both sides and preferably with equal results. By keeping the coagulating velocity of the membrane material at a constant value and overall the whole exposed surface thereof, the hollow fiber may have the desired network of filtering passages.

According to the conventional technique, the hollow fiber was solidified while being subjected to different coagulation velocities when observed at the inside and outside surfaces thereof. According to our observation, the adoption of these different coagulation velocities, the active layer could be formed only in a localized state. By keeping the equal coagulating velocities at the both sides of the hollow fiber, the core-forming substance and the secondary solvent evenly distributed in the whole body of the polymer-primary solvent solution can play their respective role in an even manner throughout the coagulating tubular wall substance of the hollow fiber, thereby fulfilling the even distribution of active zones of filtering passages throughout the tubular wall material in random manner for avoiding the formation of a localized structure.

The addition of the core-forming substance and the second or secondary solvent to the chain high polymer solution represents an important future of the preparing process.

By an even and thorough distribution of the thus prepared solution, the core-forming substance particles are distributed at substantially equal distances from each other in the body of the chain high polymer solution, and at the same time, the second or secondary solvent having least affinity to the first or primary solvent will form a net- or tree-like passage routes connecting the core salt particles. By the later extracting step, upon the coagulation of the follow fiber, these cores and the accompanying net-like structure of the secondary solvent, a corresponding net-like fine filtering passage structure remains within the material of the hollow fiber.

As will be supposed from the foregoing, increased addition of the core-forming substance will increase the number of the formed filtering passages, and vice versa. Therefore, the pore ratio will become correspondingly higher, with correspondingly reduced apparent specific gravity of the hollow fiber.

With increased quantity of the second or secondary solvent accompanied by the core salt particles, the mean pore size of fone filtering passages will become larger substantially correspondingly.

BRIEF DESCRIPTION OF THE DRAWINGS

These and further objects, features and advantages of the invention, including further particulars of the manufacturing process will become more apparent when read the following detailed description of the invention when read with reference to the accompanying drawings, in which:

FIG. 10 is a schematic and explanatory schema of a dialyzer arrangement in Example 12 to follow.

FIG. 17 shows a flow chart for the manufacture of the hollow fiber according to the present invention.

DETAILED DESCRIPTION OF THE INVENTION

Manufacture of the hollow fiber

Figure 1:
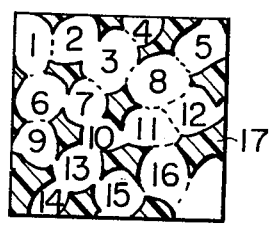
FIG. 1 is a highly modelized sectional representation of a part of the hollow fiber according to the present invention.

In order to manufacture, a synthetic or semisynthetic spinnable high molecular, chemically chain structural substance, hereinafter to be called briefly as "chain high polymer", is dissolved in a first or primary solvent to a spinnable concentration.

In the following, several preferred combination of the chain high polymer and the first or primary solvent, together with recommended range of spinnable concentration will be set forth.

| High Polymer Substance | Solvent | Recommended Concentration |
|---|---|---|
| Cellulose acetate | acetone | 20–35 |
| " | mixture of acetone and alcohol | " |
| " | mixture of methyl and alcohol | " |
| " | ethyl alcohol | " |
| " | mixture of acetone and water | " |
| v41 | mixture of methylene chloride and methanol 9:1 | 15–20 |
| " | tetrahydrofuran | " |
| " | acetic acid | " |
| Polyvinyl chloride | tetrahydrofuran | 15–25 |
| " | methyl/ethyl ketone | " |
| " | mixture of acetone and benzene | " |
| " | acetone/carbon disulfide | " |
| " | methylene chloride | " |
| Polyacrylonitrile | dimethyl formamide | 15–25 |
| " | dimethyl acetamide | 10–25 |
| Polyamide (nylon 6; nylon 66) | phenol (or cresol/water | 10–30 |
| Polyamide (nylon 6; nylon 66) | ethyl alcohol/water | " |
| Polyamide (nylon 6; nylon 66) | methyl alcohol/water | " |
| Polyamide (nylon 6; nylon 66) | formic acid | 15–25 |
| Polyamide (nylon 6; nylon 66) | dimethyl sulfoxide | " |

The above chain high polymer/solvent solution is added with a core-forming substance and a second or secondary solvent to be accompanied by the latter.

As the core-forming substance, the salt of a metal belonging to the 1–3 family of the periodic table, having an ionic radius less than 1.33 Å may be used. As an example, sodium (0.95 Å); potassium (1.33 Å); lithium (0.60 Å); magnesium (0.82 Å); calcium (0.99 Å); aluminium (0.72 Å); or copper (0.96 Å) may be raised. Most preferable metals are, among others, magnesium, calcium and aluminium.

The salt may preferably be hydrochloride, sulfide, carbonate or acetate, which is highly soluble in water or alcohols. In this respect, the hydrochloride is most preferred. These salts may be used in combination or exclusively in one kind and added to the chain high polymer solution within a range of 40–150 wt. % relative to the polymer. The kind of the salt and the amount thereof may be selected from the view point of desired pore ratio and the mean minimum pore size. With use of larger amount of the core-forming substance, the more cores will be realized and vice versa. However, with use of a too much amount of the core-forming substance, the structure of the hollow fiber will become disadvantageously fragile.

As the second or secondary solvent, $C_2$–$C_4$ aliphatic monohydric alcohol; saturated cyclic monohydric alcohol (such as cyclohexanol, cyclopentanol); aqueous solution of monosaccharide (such as glucose, saccharose or the like polyhydric alcohol); acetic acid ester of $C_2$–$C_5$ monohydric alcohol; aromatic carboxylic acid (such as benzoic acid, phthalic acid) ester, ester having only one aromatic ring, $C_5$–$C_{10}$ cyclic hydrocarbon (such as decalin, tetralin, cyclohexane), ether such as diphenyl ether, ethyl ether, and the like. These solvents may be used separately or in combination. In practice, however, a combination of two or more these solvents can be used rather more advantageously. These solvents are soluble in alcohol or water.

The above kind secondary solvent can be used in the range of 25-100 wt. % relative to the first or primary solvent. An addition of rather more quantity of the secondary solvent than the above specified range relative to the polymer solution including the core-forming substance may liably lead to disadvantageous occurrence of a phase separation or gel-formation.

The adding quantity of the secondary solvent defines substantially the critical size of the filtering passage. For larger pore size, the more must be the used quantity of the secondary solvent and vice versa.

| Chain high polymer | Core-forming salt | Accompanying solvent |
|---|---|---|
| Cellulose acetate | Calcium chloride 25-100 wt. % | Cyclohexanol, 40-150 wt. % |
| Polyvinyl chloride | Calcium chloride or $CaCl_2$ + $MgCl_2$, 25-100 wt. % | $C_{1-4}$-aliphatic monohydric alcohol, 15-100 vol. % |
| Polyamide | same as above 25-100 wt. % | Carbon chloride; alcohol; halogenated hydrocarbon; organic acid; hydrocarbon; benzene; toluene hexane; cyclohexane; kerosene; 15-100 wt. % |

If the above spinning liquor should be cast on a polished glass surface into a thin film which is then dried up gradually at room temperature by evaporating the contained solvents and finally, the formed membrane is washed with a non-solvent, such as methanol, to the chain high polymer, the resulted pore ratio would be too much low to be accepted and no formation of an evenly distributed network of fine filtering passages could be observed. Main reason thereof is attributed to such fact that the both surfaces of the membrane is subjected to different degree of solvent evaporation and the solvent evaporation is too much accelerated, thereby the concentration of the chain high polymer becoming excessively high.

According to the present invention, the above spinning liquor is discharged forcibly from an outer ring orifice of a combined inner and outer orifice assembly, while, at the same time, a core stream composing an inner coagulating bath liquid comprising exclusively water or an aqueous mixture of a coagulation-controlling solvent, having a rather medium coagulating power to the contained polymer, is discharged under pressure through the inner core orifice of the said orifice assembly.

Then, the thus discharged string composed of a tubular spinning liquor surrounding the core solvent is introduced into a coagulation bath containing a third solvent which is practically a non-solvent to the chain high polymer, yet capable of evenly dissolving in the first or primary solvent, so as to provide a coagulated hollow fiber.

Finally, the thus formed hollow fiber is subjected according to this invention to an extracting step wherein the fiber is dipped in a bath containing an extracting liquid which is a non-solvent to the chain high polymer, yet capable of dissolving the core-forming substance as well as the entrained solvent by the latter, or having affinity to the said substance as well as the entrained solvent, for the purpose of extracting these substance and solvent.

By adopting the above mentioned several steps, the hollow fiber of the present invention can be surprisingly provided.

By the execution of the above extracting step, an evenly distributed network of the fine filtering passages is formed in the wall of the hollow fiber. Generally speaking, the network is formed throughout the tubular wall. Under occasion, the network may be formed within a ring-shaped active layer appearing in the tubular wall, when seen at its cross-section.

When it is desired to provide an optimal hollow fiber, representing its pore ratio over 60% and no localized and segregated active zone, use of such inner coagulation bath liquid comprising a combined methanol/water, the volumetric mixing ratio ranging from 3:7 to 7:3, most preferably 1:1, is highly recommendable. In addition, in this case, the composition of the outer coagulation bath should preferably be same as that of the inner bath.

The discharged combined string from the nozzle assembly is passed under gravity action through air atmosphere space extending from the latter to the coagulating bath. This space is covered with a hollow cylindrical cover which is formed with one or more fine communication openings for limiting free communication between the covered limited space and the surrounding open air atmosphere. The temperature maintained in this limited space is properly conditioned, so as to be substantially equal to that of the discharged spinning liquor. These measures are adopted for preventing excess evaporation of the contained solvents in the combined string.

The membrane filtration type hollow fiber filter according to this invention must have a sharp filtering performance which may be expressed in terms of least fluctuating degree in the distribution of minimum pore points at active zones of fine filtering passages. For the measurement of such distribution, mercury is forced into the filtering passages by means of a mercury porosimeter. The required distribution value may be determined by plotting the mercury force-in pressure, P, against the quantity, V, of the forced-in mercury.

On the other hand, the filtration sharpness can be determined from the known formula to be described. At first, the distribution of minimum pore size points is determined from a known formula, the peak of the plotted curve representing the mean minimum pore size point. The distribution of these minimum pore size is then expressed in terms of standard deviation $\sigma$. Better or worse distribution can be determined by larger or smaller value of such $\sigma$ which corresponds to the filtering sharpness.

When theoretically to say, the filtering performance is sharp if the following mathematical formula is satisfied:

$$\sigma \leq 1$$

Figure 7:
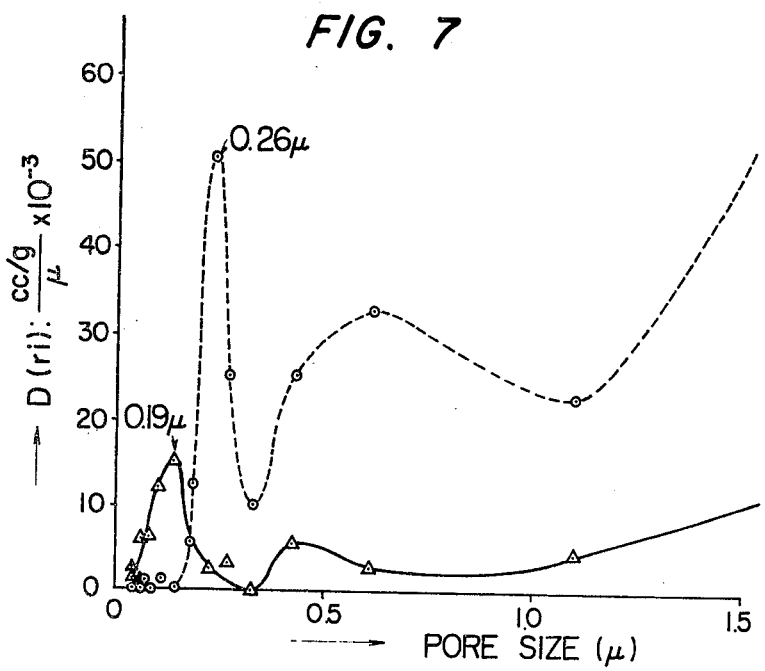
FIG. 7 shows two different pore size distribution curves.

However, in practice, it will be safficient, $$\sigma/\bar{x} \leq 1$$

wherein, $\bar{x}$ stands for mean minimum pore size.
Or more specifically, $$\sigma = \sqrt{\frac{\sum_{i=1}^{n}(x_i - \bar{x})^2}{n}}$$

$$\bar{x} = \frac{\sum_{i=1}^{n} x_i}{n}$$

where, n stands for the number of data relating to the distribution of minimum pore size points;

$\bar{x}$ stands for the pore size, in $\mu$, at the mean minimum pore size point;

$x_i$ stands for the pore size, in $\mu$, at i-th datum, of minimum pore size points;

When the distribution curve is plotted relating to the experiment of Example 1, a sample curve is obtained as shown in FIG. 7 from which $\bar{x}$ or the mean minimum pore size point can be determined. In addition, the sharpness can be adjudged therefrom.

As an example, the sample showing the minimum pore size point at 0.26$\mu$ can be adjudged to have a sharp distribution and thus a sharp filtering performance. On the other hand, although the sample showing the point at 0.19$\mu$ represents a rather gentle distribution, the filtering performance could be adjudged as sharp according to its calculated results.

As for another sample representing the said point at 0.19$\mu$ the distribution of smaller pore side curve portion is sharp and therefore, it can be adjudged as having a sharp filtering performance in its practical use.

Pore size distribution can be measured in the following way.

Mercury is forced into the pores of the tubular wall of a hollow fiber, as mentioned before, and mean pore size can be determined from the forced-in quantity of mercury, and the overall pore volume.

It it is assumed that the pore or fine filtering passage formed through the wall of a hollow fiber be of round circle in its cross-section, the force-in pressure P (kg/cm$^2$) of mercury into the pore will be:

$$P = -2\sigma \cos\theta / r$$

where, r stands for the radus of the bore.

In the practical determination, the cumulatively added volumes V of the pores at various force-in pressures $P_i$ are measured, and a V-P curve is plotted, from which values of dV/dP or dV/dr are found, so as to show the corresponding pore size distribution.

Figure 6:
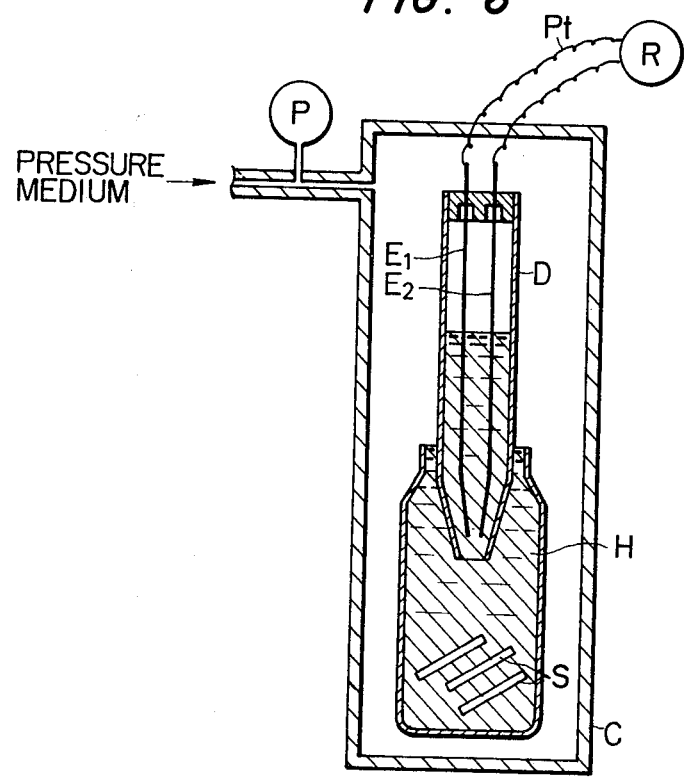
FIG. 6 is a schematic section of a porosimeter adapted for the measurement of the porosity of a hollow fiber.

In FIG. 6, an apparatus designed for such measurements are schematically shown, in which several constituent parts are denoted as follows:

P . . . pressure gauge; C . . . pressure vessel; S . . . samples; D . . . test bottle; R . . . ampere meter; E$_1$; E$_2$ . . . electrodes; Pt . . . electrical leads connecting the ampere meter with the electrodes; H . . . mercury.

With gradually increasing the pressure of the gaseous pressure medium such as nitrogen gas for varying the mercury force-in pressure by observing the gause P, ampere variation is observed at the ammeter R.

When the resistance is denoted $R_i$ for force-in pressure $P_i$, then the following formula can be established.

dV/dR = constant;

$\Delta V_i = C(R_{i+1} - R_i)$

Then, pore size distribution is:

$$D(r_i) = \frac{\Delta V_i}{P_{i+1} - P_i};$$

$$r_i = \frac{-2\sigma \cos\theta}{P_i}$$

The wanted value: $D(r) - r$ can thus be determined.

In the above explanation, surface tension of mercury and contacting angle $\theta$ were assumed as follows.

$\sigma = 480$ dyne/cm; and $\theta = 140°$ (cos $\theta = -0.777$)

A plant for the manufacture of cellulose acetate hollow fiber according to the invention is shown only schematically in FIG. 17.

In FIG. 17, numeral 20 represents an electric drive motor, say 1 HP, which drives an agitator 22 through a transmission chain 21 and at a speed of 800 r.p.m.

Numeral 23 represents a preparation tank, of 5 lit. capacity, having an inlet socket 23a. Starting materials, such as cellulose acetate, first solvent, core-forming salt and second solvent are introduced through this socket into the preparation tank and thoroughly mixed together to a homogeneous spinning liquor which is fed through a first piping 24 to a feeding gear pump 55. The composition of the spinning liquor may be that to be given at Example 1 to follow.

The spinning liquor is conveyed through a second piping 24a to a candle filter 25 which serves for removal of the included solids from the liquor. The latter is warmed up in this candle filter by means of warm water supplied thereto from a tank 26 through a pump 27 and a supply piping 28.

The filtered and warmed spinning liquor is then conveyed from the candle filter 25 through a third feed piping 29 to a double orifice spinning head 30 enclosed by a cover 31 which is perforated, so as to allow the confined air to communicate with outside open atmosphere, only to a limited degree.

A head tank 32 is provided for the preparation of inner coagulating bath liquid comprised of water and methanol in a volumetric ratio of 1:1 which bath liquid is then fed through a piping 33 to an inner or core nozzle element, not shown, of the head 30. The flow rates of the spinning liquor is regulated by adjusting the r.p.m. of gear pump 55, while that of the inner coagulation bath liquid is controlled by adjustment of an adjusting valves 34 and 35 fitted in the piping 33.

The inner orifice has a bore of 0.3 mm, while an outer concentrically arranged ring orifice, not shown, of the spinning head has an outside diameter 0.6 mm, through which the spinning liquor was discharged under pressure. The wall thickness of the ring wall may amount to 0.15 mm.

The thus extruded combined liquor ring travels through a distance of 100 mm within the confined air atmosphere until it is immersed into a coagulation bath 37 contained in a reservoir 36, said bath consisting of a mixture of water and methanol 1:1. The reservoir has a capacity of 130 lit, the outline dimensions thereof being 500×390×660 mm.

The thus coagulated hollow fiber 38 is guided by two guides 39 and 40 and fed into a flowing extension of the coagulating bath for the execution of enough coagulation. The flowing bath is guided by an elongated and sloped Vee-type guide trough, from the terminal end of which the bath liquid is discharged through a piping 42 into an intermediate tank. The coagulation bath liquid is then returned the refrom through a circulating pump 44 and a return piping 45 back to the reservoir 36. The length of the trough amounts to 4.5 meters.

The thus formed hollow fiber 46 is subjected to a traversing motion by means of a traverse guide 47 and finally wound up on a aluminium drum 48 which is partially dipped in a coagulating bath tank 49, for enough coagulation of the hollow fiber and for keeping the latter at its wetted condition. This is final stage bath has the same composition as before and a capacity of 10 lit. The winding drum has a diameter of 300 mm and rotates at 16 r.p.m. Numeral 50 represents a ready-for-use reserve winding drum.

In the following, several preferred embodiments of the invention will be set forth for better understanding thereof.

EXAMPLE 1

A cellulose acetate spinning liquor, degree of acetylation: 54.2%, degree of polymerization: 202, containing cellulose acetate 40 gr., a combined solvent 150 gr. consisting of acetone 120 gr. and methanol 30 gr., calcium chloride 20 gr., and cyclohexanol 105 gr. as non-solvent to the acetate, which were intimately agitated for 4 hours so as to provide a homogeneous solution. This solution was settled at room temperature for an hour and then defoamed. The cellulose acetate content amounted to 26.7 wt.% to the combined solvent, the ratio of the non-solvent to the latter amounting to 70 wt.%, while the chloride content amounted to 50 wt.% to the acetate.

The spinning liquor was then discharged under pressure through a ring orifice of O.D. 1.0 mm at a rate of 4.3 ml/min, while at the same time, an inner coagulation liquor consisting of a volumetric 1:1-mixture of methanol and water was discharged under pressure through a core orifice of I.D. 0.3 mm at a rate of 2.0 ml/min. These outer and core orifices were formed in a combined ring orifice assembly.

The combined acetate sheath-aqueous solvent core string was passed through a substantially closed air atmosphere for a small distance of 100 mm under gravity, and was introduced into a coagulation bath consisting of 1:1-methanol/water. The hollow fiber was passed through a 100%-methanol bath.

The limited air atmosphere was formed within a chamber which was substantially prevented from communication with ambient atmosphere for avoiding excess evaporation of the solvent. This chamber was formed by a plastics cylinder covering the passage of the string from outlet end of the orifice assembly to the aqueous bath, small two 5 mm-diameter holes being perforated through the cylinder wall for allowing only optimum evaporation of the solvent. The cylindrical air space was held cold at the room temperature. The spinning speed was 15.4 meters per minute. The hollow fiber was of I.D. 340$\mu$, O.D. 520$\mu$, wall thickness of 90$\mu$.

Figure 4:
FIGS. 4 and 5 are representative microscopic photographs of a hollow fiber prepared by the process to be described specifically in the following Example 1, the respective magnification being 267 and 160, respectively.
Figure 5:
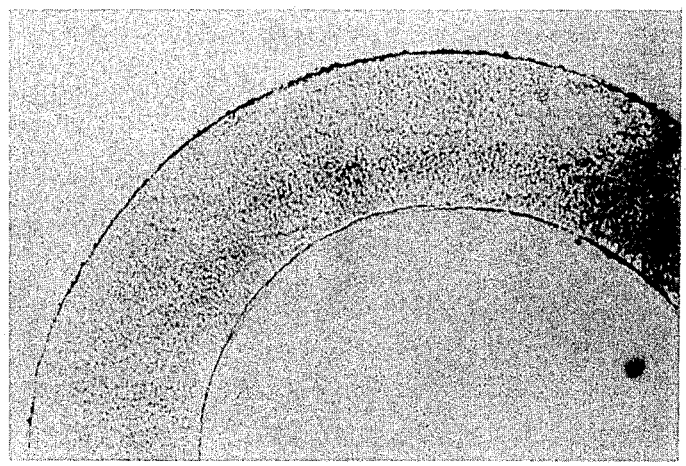

Cross sectional appearance of this hollow fiber are shown by way of example in FIG. 4 and FIG. 5, the magnifying factor being 267 and 160, respectively. As seen, a large number of fine filtering passages forms a network system, being substantially uniform and representing no localized active layer.

The passage characteristics of this kind hollow fiber are shown only schematically in FIG. 1 wherein numerals 1–16 represent fine filtering zigzag passages mutually communicating and formed into a tree- or net-like structure which allows filtration between either one of the tube surfaces of the fiber to the other. Same tree- or net-like structure of filtering passages could be seen on a longitudinal section, although not shown. Thus the net structure is of three-dimensional. Numeral 17 represents the fiber-forming material per se.

Figure 2:
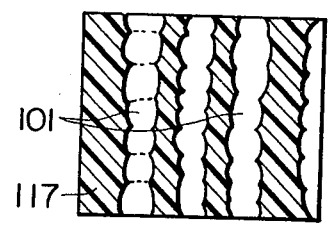
FIGS. 2 and 3 are corresponding modelized sectional schema of known hollow fibers.
Figure 3:
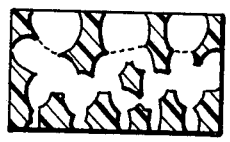

In FIGS. 2 and 3, schematic representations of comparative and conventional filter structures are shown. In the structure of FIG. 2, a plurality of substantially linear and mutually non-communicated filtering pores are formed, and extend from either wall surface to the opposite one, although not shown. In this structure, when a pore is clogged, the pore can not operate as a filter element. If such accident should occur at substantially all of the pores, the filter performance would drop suddenly.

An example of conventional structure shown in FIG. 3 represents a localized formation of active filtration layer at or in close proximity of either wall surface. In this case, the localized existence is shown at the bottom of FIG. 3. With such localized structure, the effective filtering zone is highly limited in its volume and prevented from an elongated period of the use, and indeed, by the invitation of an earlier clogging.

The pore ratio to be expressed by P can be determined in the following way when applied to the case of the foregoing Example 1.

Now assuming the specific gravity of cellulose acetate Pa being 1.30, that denoted Pb of the hollow fiber was calculated from the thickness of the tubular wall of a 200-fold sectional microscopic photograph of a sample of 100 cm-length. The weight of the sample was determined by practical weighing, while the volume thereof was determined by a calculation from the above data. The pore ratio P, thus determined, was 65%.

A normal type pore size distribution curve of the novel hollow fiber is shown by way of example by a full line curve in FIG. 7. The mean pore size was determined at the peak of this curve and determined as 0.194.

For the determination of the filtering performance, a latex suspension was prepared in which 0.2$\mu$-particles of latex were suspended in water to a concentration of 0.05%. Then, ten hollow fibers were bundled by bonding ends of these fibers by means of a chemical binder. The latex suspension was kept in pressure contact with the outer wall surfaces of these fibers and the filtrate was taken out from the hollow cores thereof. It was found that all 0.2$\mu$-latex particles were perfectly retained. The clean filtrate was obtained at a rate of 10.0 m$^3$/m$^2$ with a pressure of 0.5 kg/cm$^2$ by operation ofr 30 minutes.

A reversed flow filtration was tested from inside to outside of these hollow fibers, under similar filtering conditions. The filtrate was equally clean and the filtrate output was 11 m$^3$/m$^2$ which is about 10% higher than before.

EXAMPLE 2

A spinning liquor was prepared from cellulose acetate 45 gr., acetone/methanol 120 gr.:30 gr., calcium chloride 25 gr. and cyclohexanol 105 gr., in the same manner as before. Acetate content to mixed solvent: 30 wt.%. Calcium chloride content to the cellulose acetate: 55.6%. This liquor was spun into hollow fibers as before. O.D. of fiber: 470$\mu$: I.D.: 280$\mu$; wall thickness: 95$\mu$; pore ratio: 62.5%, mean minimum pore size: 0.05$\mu$.

The cross-section of the hollow fiber represented as before a unified network of fine filtering passages, representing no localized active filtering layer.

8000 pieces of the hollow fibers were bonded together at their an effective filter. Pure water was filtered by means of the above hollow fiber bundle from inside to outside thereof at 100 mmHg. The output amounted to 112 lit./m²hr.

A bundle of ten hollow fibers above prepared was bundled together by bonding at their end portions to provide a filter.

A β-albumin 2g/dl-solution prepared from beed blood serum was supplied to the hollow cores of the fibers for a test filtration purposes, and it was found that all the contained albumin was completely passed through the filtering pore passages. By filteration of a quantity of human ascites containing cancer cells with the same hollow fiber bundle, it was found that all such cells were effectively prevented from passing through the filtering pore passages.

EXAMPLE 3

Same spinning liquor as used in the foregoing Example 1 was discharged under pressure from the ring orifice set forth therein, while a combined solvent: acetone/water, 1:1 by volume, was supplied to the inside core orifice, and as the inner coagulating bath liquor. The discharged combined liquid string was passed through an open atmosphere along the same distance as before, into a pure water bath. Other operating conditions were same as before.

The thus formed hollow fiber represented, however, a localized active filtering layer positioned at the outer wall surface thereof, while the inside wall surface represented a rough net-like structure.

The hollow fiber showed: O.D. 570μ; I.D. 370μ; wall thickness 100μ, pore ratio 65.5%. Upon determined the pore size distribution curve as before, from mercury porosimeter test results, it showed two different peaks. The larger pore size peak showed those of the inside rough net-like structure which did not constitute an effective filtering layer, while the smaller pore size peak corresponded to the outer finer active layer having a mean minimum pore size 0.20μ.

EXAMPLE 4

A cellulose acetate spinning liquor was used which was of the following characters.

| | |
|---|---|
| degree of acetone: | 54.0%; |
| degree of polymerization: | 200; |
| quantity of cellulose acetate: | 40 gr; |
| primary or combined solvent: | acetone 120 gr. plus methanol 30 gr.; |
| calcium chloride as core-forming substance: | 20 gr.; |
| secondary or core-accompanying solvent: | any one of the following solvents tabulated, quantity being 75–120 gr. (50–80 wt. % to the primary); |

Other preparing and spinning conditions were same as those of Example 1.

The mean minimum pore sizes of the thus obtained membrane filtration type hollow fibers are also tabulated below. The fiber wall represented a well distributed network system of fine filtering pore passages as before.

TABLE 1

| Secondary Solvent | Mixing quantity, gr. | Mean Minimum pore size, μ |
|---|---|---|
| cyclohexanol | 105 | 0.194 |
| cyclopentanol | 75 | 0.05 |
| decalin | 120 | 0.45 |
| cyclohexane | 100 | 0.125 |

EXAMPLE 5

Spinning solutions, including calcium chloride and cyclohexanol in the following tabulated quantities, were prepared and spun under the similar conditions as in Example 1, so as to provide membrane filtration type hollow fibers, having respective mean minimum pore sizes and pore ratios, as tabulated.

TABLE 2

| Test No. | Calcium chloride, gr. | Cyclohexanol, gr. | m.m.p.s. | pore ratio, % |
|---|---|---|---|---|
| 1 | 28 | 120 | 0.6 | 70.3 |
| 2 | 20 | 105 | 0.2 | 65.0 |
| 3 | 16 | 75 | 0.03 | 55.5 |
| 4 | 20 | 120 | 0.4 | 66.8 |
| 5 | 16 | 120 | 0.09 | 52.7 |

EXAMPLE 6

Spinning liquors were prepared and spun under the similar conditions as in Example 1, however, with use of different inside coagulation bath liquid; outside coagulation bath liquid and gravity drop passage length as tabulated below. In the table, the mean minimum pore sizes of the thus obtained membrane filtration are also given.

TABLE 3

| Inside coag. bath | water | water/methanol, 1:1 | | water/acetone, 1:1 | |
|---|---|---|---|---|---|
| Outside coag. bath | water | same as above | water | same as above | water |
| gravity drop passage length, mm | 100 | 100 | 200 | 100 | 200 |
| Mean min. pore size, μ | 0.05 | 0.2 | 0.08 | 0.15 | 0.10 |
| Pore ratio, % | 60 | 65 | 63 | 64.5 | 64.0 |

EXAMPLE 7

Spinning liquors were prepared and spun as in the similar conditions of Example 1, however with the following data:

| | |
|---|---|
| degree of acetylation: | 54.2%; |
| degree of polymerization: | 202 |
| quantity of cellulose acetate: | 40 gr. |
| primary combined solvent: | acetone 120 gr. plus methanol 30 gr. |
| secondary solvent: | cyclohexanol. 105 gr. and |
| one of various core-forming materials as tabulated. | |

TABLE 4

| Metal salt | Added quantity, gr. | m. min. pore size, μ | Pore ratio, % |
|---|---|---|---|
| Calcium chloride | 25 | 0.25 | 68.3 |
| Calcium nitrate | 40 | 0.85 | 75.1 |

TABLE 4-continued

| Metal salt | Added quantity, gr. | m. min. pore size, μ | Pore ratio, % |
|---|---|---|---|
| Calcium bromide | 35 | 0.30 | 70.5 |
| Calcium iodide | 40 | 0.31 | 73.8 |
| Lithium chloride | 10 | 0.40 | 58.4 |
| Lithium nitrate | 20 | 0.73 | 63.0 |
| Lithium bromide | 40 | 0.62 | 76.2 |
| Magnesium nitrate | 35 | 1.02 | 69.0 |
| Magnesium chloride | 8 | 0.25 | 53.7 |

Each wall of the thus formed membrane filtration type hollow fibers represented a well distributed network system of fine filtering passages.

EXAMPLE 8

A mixture of nylon 60 gr., methyl alcohol 150 gr., water 90 gr. and $CaCl_2 \cdot 2H_2O$ 30 gr. was enough agitated at 70° C. for 48 hours to provide an even solution which was spun in the similar way as was set forth in Example 1, with use of methanol/water, 1:1 as the inside as well as outside coagulation bath liquid.

In this way, a hollow fiber of a well and evenyl distributed network of fine filtering passages of about $0.1\mu$.

EXAMPLE 9

A mixture of nylon 100 gr., phenol 36.0 gr. and water 40 gr. was thoroughly mixed together and added with $CaCl_2 \cdot 2H_2O$ 40 gr. and further agitated to provide a spinning solution which was then spun under the similar conditions as of Example 1. Water/chlorobenzene, 1:1, was used as the inside as well as the outside bath liquid. The thus formed nylon hollow fiber represented a well distributed network system of the fine filtering passages of about $0.1\mu$ which means the mean minimum pore size. The last-mentioned meaning can be applied to several foregoing Example.

EXAMPLE 10

A mixture of:

| | | |
|---|---|---|
| polyvinyl chloride: | | 50 gr., |
| combined solvent: | | 400 gr., |
| consisting of tetrahydro furan | | 180 gr., |
| acetone | | 180 gr., |
| and methylene chloride | | 40 gr. |
| methanol | | 300 cc |
| and | | |
| $CaCl_2 \cdot 2H_2O$ | | 25 gr. | was enough agitated at room temperature to provide a homogeneous solution which was spun under similar condition as of Example 1, with use of methanol/water, 1:1, as the inside as well as the outside coagulation bath liquid. The thus formed hollow fiber of polyvinylchloride was provided with a well-distributed network system of fine filtering passages of mean minimum pore size: $0.2\mu$.

EXAMPLE 11

Figure 8:
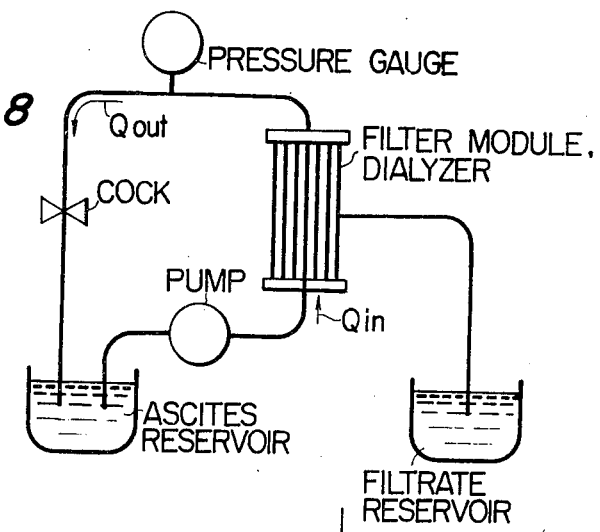
FIG. 8 is a schematic explanatory view of a dialyzer arrangement employing a filter unit comprising a parallel arrangement of hollow fibers of the present invention, and as will be described in Example 11 to follow.

A number of the hollow fibers obtained in Example 1 were bundled together to provide a filter module which had an effective filtering surface area of 0.5 m² and was used as a dializer for the filtration of an artificial ascites containing a predetermined quantity of cancer cells. The whole filter arrangement is shown only schematically in FIG. 8.

The results are given in the following table.

TABLE 5

| | Before filtration | After filtration |
|---|---|---|
| Cancer cells | present | none |
| Albumin | 0.5 | 0.5 |
| Globumin | 0.7 | 0.65 |
| $Na^+$ | 200 | 200 |
| $K^+$ | 4.0 | 3.9 |
| Cl | 96.5 | 99.1 |
| Cholesterol | 48 | 32 |
| Bilirubin | 0.35 | 0.10 |

The negative pressure was 100 mmHg. Qin (inlet flow rate) was 90 ml/min and Qout (outlet flow rate) was 44 ml/min.

EXAMPLE 12

A number of the hollow fibers obtained in Example 1 were bundled together, so as to provide a filter module called dializer which was used for the filtration of albumin. As a result, it was found that the albumin passage rate does not show any appreciable change in function with time.

Figure 9:
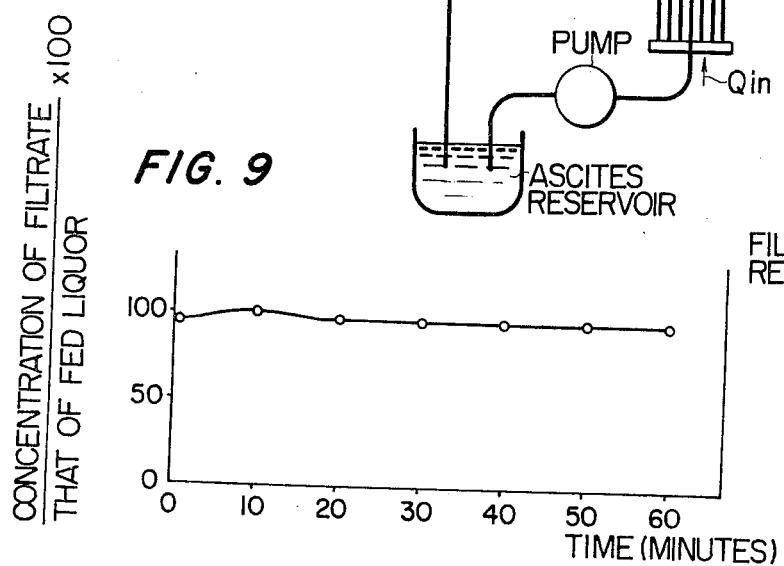
FIG. 9 is a characteristic performance curve using a filter composed of a number of hollow fibers of the invention, as will be described in Example 12 to follow, the test being carried out with use of albumin for allowing its passage.

The filtering liquid was comprised of beef serum p-albumin dissolved in physiological saline at a ratio of 0.2 gr./dl. The whole filtering arrangement is shown at FIG. 10. The results are shown schematically at FIG. 9.

EXAMPLE 13

1000 hollow fibers obtained in Example 1 were bundled together, so as to provide a dializer to which a flow of human blood was supplied under pressure. During the filtering operation, blood plasma passed well without hindrance, while blood cells were retained.

EXAMPLE 14

10 hollow fibers obtained in Example 1 were bundled together, so as to provide a filter module. A flow of cigarette smoke was supplied to the cores of the hollow fibers, while the outer surfaces thereof were kept in a negative pressure atmosphere. Smoke particles were effectively preserved without passage through the filtering fiber walls.

EXAMPLE 15

10 hollow fibers were bundled together, so as to provide a filter module as in Example 14. A flow of pure water, preparatorily passed through an ion exchanger, was supplied under pressure to the cores of the hollow fibers. During the filtration, electric resistance drop in the filtrate was continuously measured. No such drop was sensed and a constant resistance, $10^{-8}$ ohms, was measured which represents no inpurities existing.

EXAMPLE 16

Since the hollow fiber obtained in Example 1 is in its water-containing state, it was subjected to a successive steps for removal of its aqueous content filled in the fine filtering passages.

Figure 11:
FIG. 11 is an electron microscopic photograph of a part of a hollow fiber as obtained in Example 16 to follow, the magnification of the cross-section being 3760.
Figure 12:
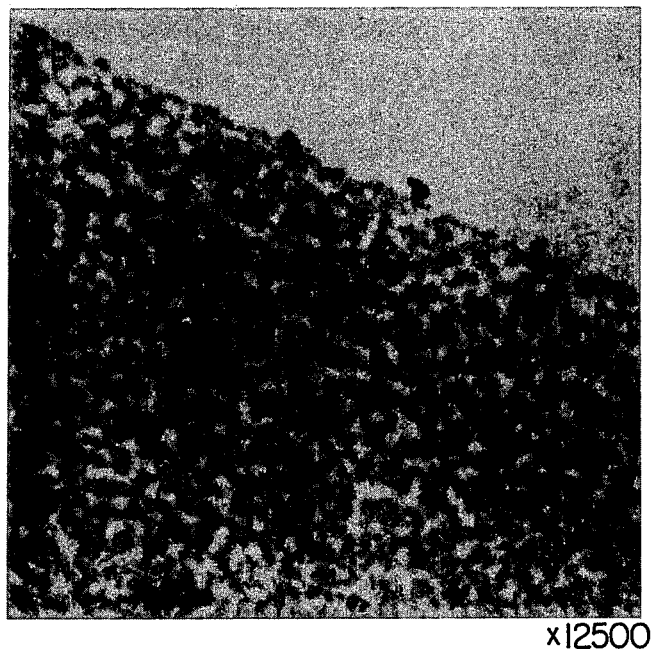
FIG. 12 is a still enlarged sectional and microscopic photograph, the magnification being 12,500.
Figure 13:
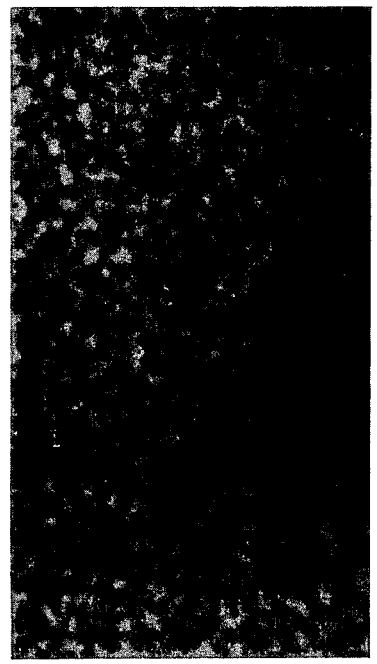
FIG. 13 is a similar view to FIG. 12, showing a cross-section of a hollow fiber prepared at Example 16 to follow, being taken from a middle part of the section.

For this purpose, the hollow fibers were treated in several steps with successively denser aqueous solution of ethanol for replacing the contained water by the latter. After execution of a full water purge, the replaced ethanol solution was stepwise purged in the equal way by treating the hollow fibers with successively denser MMA (methylmetacrylate), the latter being finally polymerized by addition of a proper polymerization accelerator to a solid polimer for physically occupy the fine filtering passages, for allowing slicing job. The cross-sectionally sliced thin sheets of the hollow fiber were observed under an electron microscope. Several representative views thereof are shown in FIGS. 11-13.

A two-dimensional, and thus supposedly three-dimensional network system of evenly distributed and mutually communicating fine filtering passages is clearly seen in each of these photographic representations, stress being however occasionally applied for intensifying the contrast. As seen, the network structure is substantially uniform throughout, without formation of any localized segregation when expressed in melallugical terms.

EXAMPLE 17

Figure 14:
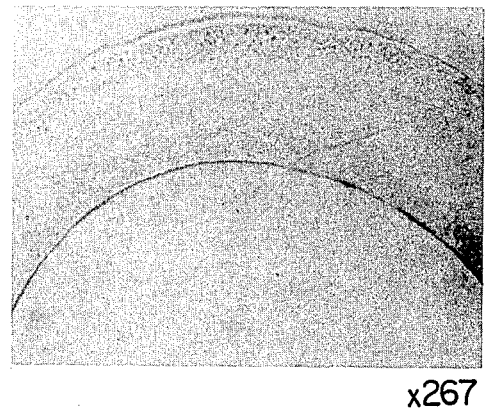
FIGS. 14 and 15 are two sectional microscopic photographs of a hollow fiber obtained in Example 17 to follow.

In Example 1, the coagulation is now executed at an elevated temperature such as 30° C. and with an aqueous solvent which is however a non-solvent to the cellulose acetate, yet having a high affinity to the main solvent used for dissolving the latter. A microscopic cross-sectional photograph of the thus modified hollow fiber in its aqua-filled state in the filtering passages is shown in FIG. 14.

The contrast was accentuated.

This hollow fiber was subjected to a dehydration step by lyophilization and the thus solidified product was sliced and observed under a scanning electron microscope. Two photographic views thereof are shown in FIGS. 15 and 16.

Figure 15:
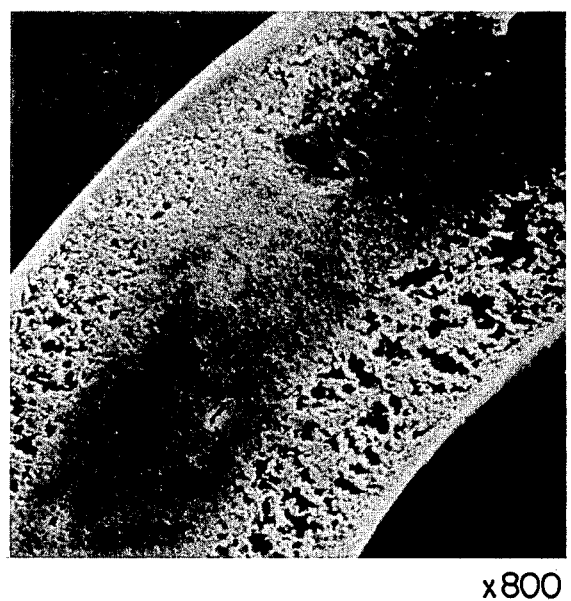
Figure 18:
FIG. 18 is a cross-sectional and electron microscopic photograph of a hollow fiber according to the present invention, after having been lyophilically dried up, as will be fully described in Example 1 to follow, the magnification being 850.

A rather rough pored zone is seen at FIG. 15 along each of the inner and outer wall surfaces. The formation of these rough zones may be attributed to the surface contraction taking place during the liophilic dehydration step. The effective and active zone takes, in this case, a form of central ring where an indefinite number of very finer filtering passages are seen in their cross-section. The marginal rough pored ring zones are supposed to be absent in the hollow fibers ready for use.

Figure 16:
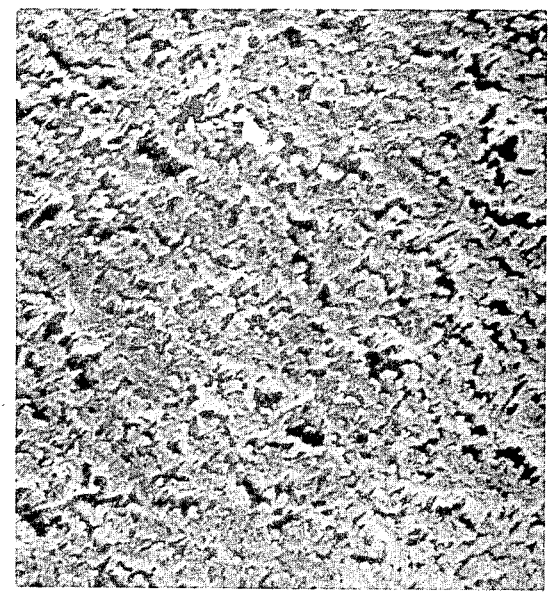
FIG. 16 is an electron microscopic photograph of a part of cross-section of a hollow fiber of the present invention, demonstrating a kind of network of fine filtering passages.

The inner and outer rough pored ring zones seen in each of the photographs of FIGS. 14-16 represents a kind of network system, squeezing the central active ring zone from both sides thereof, said central ring zone representing the desired network of fine filtering passages which are similar to those which were explained in Example 1. In fact, the rough pored marginal ring zones provide physically effective supporting layers to the central active zone. Therefore, such multi-phase structure hollow fibers may also well be within the scope of the appended claims.

The forming mechanism of the marginal rough pored zones may be explained as follows:

At the initiation of the liophilic dehydration step, the inner and outer wall surfaces of the hollow fiber are subjected to a sudden coagulation to a substantial degree and the main solvent to the acetate, being filled in the filtering passages will be gradually replaced by the water, resulting in a kind of dilution of the inner coagulation bath liquid still contained in the hollow fiber core, and thus in a corresponding reduction in the coagulating performance thereof. Thereafter, the gel-formation and coagulation will progress in the similar mechanism to that appearing in the invention.

With continued operation of the manufacturing process, the outer coagulation bath will reduce gradually its coagulating performance. Therefore, generally speaking, it is better to control the bath concentration to a predetermined constant value. If not, a rough pored structure will be formed gradually thicker along the outer wall surface of the hollow fiber. But, this rough pored layer will act as a supporting one to the fine porous main filtering active zone utilizable for the desired purpose.

EXAMPLE 18

In the Example 1, the inner coagulating bath was comprised exclusively of water, while as the outer coagulation bath, a combined aqueous solution methanol/water, 7:3 (volumetric), was employed.

In this modified case, the tubular material discharged from the double orifice assembly was subjected to an accelerated coagulation at and inclose proximity to the inside wall surface, while the outer wall surface was subjected to a decelerated coagulating action, in comparison with the corresponding one appearing in the foregoing Example 1. The results were such that the tubular wall represented a three-layer structure. The outer most layer was of the active one usable for the desired purpose, while the innermost layer was a rough pored supporting one.

EXAMPLE 19

As a modified experiment, the double orifice assembly set forth in Example 1 was modified, so as to have outer orifice bore diameter: 2.0 mm, and inner orifice bore diameter: 0.6 mm. Other operating conditions were same as in Example 1.

Figure 19:
FIG. 19 is a similar photograph of the same hollow fiber, the magnification being 267.

A microscopic sectional view of the thus formed hollow fiber is shown in FIG. 19. It will be seen that the whole structure was of the desired nature.

The hollow fibers represent several superiormerits.

In the case of such filtering operation where the initial quantity of the treating liquid is plenty before introducing into the filter, while the quantity of the filtrate is rather small, the liquid may be passed from the outer to the inside surface of the hollow fiber bundle filter. The reverse filtering direction may be employed on the contrary, when the filtering liquid is highly precious such as human blood. Such vast utilization possibility is, indeed, thanks to the reverse operability of the hollow fibers with equal reverse performance obtainable according to this invention. Such effect could not be obtained by use of non-uniform pore structure as frequently seen in conventional hollow fibers.

According to our knowledge, the membrane filtration type filter has been realized exclusively in the form of sheet-like films or tubes only manufactured therefrom. However, according to this invention, hollow tubular fibers can effectively be provided even if they should be of the membrane filtration type.

When the hollow fiber filter is used for the purification of human ascites, cancer cells and fungi can be removed effectively. When used for the treatment of human blood, the plasma and the blood cell are separated from each other. Since the hepatic patient has troubles in his blood plasma and, therefore, the latter must be exchanged for healthy one. In such plasma exchange operation, the inventive hollow fiber filter can be most advantageously utilized.

Dishes are broadly used for the culture of tissues and thus, most advantageous three-dimensional culture technique is highly limited on account of liable accumulation gaseous and liquid state discharges from the cultures. With use of the hollow fibers, nourishments can be fed-in, while the discharged gases and liquids are taken out through the hollow fiber. Therefore, a unique and profound three dimensional culture can be brought about in this respect.

On the other hand, various grades of pure water are required to use in electronic, semiconductor-, silicon wafer-, photo-printing, photosensitive paper manufacturing, and photoprints-manufacturing industries. In this respect, pure water is being produced by use of a large two-dimensional membrane filter for the removal of impurities. This kind of membrane must be, however, frequently exchanged on account of short usable life. In this respect, the efficient hollow fiber filter according to this invention would be most advantageous and economical, especially on account of its very compactness, high filtrate output and efficient filtering sharpness.

The embodiments of the invention in which an exclusive property or privilege is claimed are as follows:

1. A cellulose acetate membrane filtration type hollow fiber comprised of a single material phase, wherein the cylindrical wall defining said hollow fiber represents a three-dimensional net-like structure of fine filtering passages of 0.01 to 1 micron, said structure occupying the whole mass of said wall when seen in any cross-section of said wall, providing thus on effective and active filtering zone, the pore rate amounting to at least 55%, active points of the filtering passages for governing minimum passable sizes of said passages for solids included in a filtering liquor to be treated being distributed at random throughout at least said active zone, said passages being nearly uniform.

2. A process for the preparation of a membrane filtration type hollow fiber comprising the steps of:
   1. dissolving the polymer in a first solvent in an amount of 10 to 35% by weight;
   2. adding a core-forming substance to said solution in an amount of 40 to 150% by weight based on the weight of the polymr;
   3. adding a second solvent having an affinity for said first solvent and capable of dissolving said core-forming substance but incapable of dissolving said polymer in an amount of 25 to 100% by weight based on the weight of the first solvent;
   4. mixing thoroughly said constituents to an even spinning liquor;
   5. discharging said spinning liquor under pressure through a ring orifice zone encircling an inner core orifice zone;
   6. discharging concurrently under pressure a core stream of water or an aqueous solution containing a second and coagulation-controlling solvent, as an inside coagulating bath liquid through said core orifice zone;
   7. leading the liquid discharged from the ring-shaped spinning liquid orifice to drop under gravity action into the space extending from the said spinning nozzle and covered with a hollow cylinder having at least one fine communication opening for substantially preventing communication between the covered limited space and surrounding ambient air atmosphere;
   8. introducing the string product from the foregoing step (6) into a coagulation bath containing a third solvent incapable of dissolving said polymer and capable of dissolving evenly in said first solvent, for coagulating the tube of said polymer; and
   9. introducing said coagulated tabular product into a further bath containing an extracting liquid, incapable of dissolving said polymer, yet capable of dissolving said core-forming substance and said second solvent liable to be accompanied by said substance, or at least having an affinity for said second solvent, thereby extracting said substance and said second solvent accompanied thereby, and forming thus a network of fine filtering passages throughout the wall of said tubular product or at least an active ring zone thereof.

3. A process according to claim 2, wherein the core-forming substance of step (2) is a metal salt.

4. A process according to claim 3, wherein the core-forming substance is $CaCl_2 \cdot 2H_2O$.

5. A process according to claim 2, wherein the second solvent is cyclohexanol.

6. A process according to claim 2, wherein the coagulation bath liquid in the step (8) and the inside coagulation bath liquid in the step (6) represent the same composition of methanol/water.

* * * * *

UNITED STATES PATENT AND TRADEMARK OFFICE
CERTIFICATE OF CORRECTION

PATENT NO. : 4,234,431
DATED : November 18, 1980
INVENTOR(S) : Mashahiro Mishiro et al It is certified that error appears in the above-identified patent and that said Letters Patent are hereby corrected as shown below:

Column 7, line 11, delete "ofthe" and insert -- of the --.
Column 15, line 23, delete "evenyl" and insert -- evenly --.
Column 18, line 33, delete "superiormerits" and insert -- superior merits --.
Column 19, line 23, delete "on" and insert -- an --.

Signed and Sealed this

Twelfth Day of October 1982

[SEAL]

Attest:

GERALD J. MOSSINGHOFF

Attesting Officer     Commissioner of Patents and Trademarks